(12) United States Patent
Beck et al.

(10) Patent No.: US 10,378,672 B2
(45) Date of Patent: Aug. 13, 2019

(54) METHOD OF CONTROLLING A VALVE AND VALVE

(71) Applicant: Buerkert Werke GmbH & Co. KG, Ingelfingen (DE)

(72) Inventors: Klaus Beck, Krautheim (DE); Sebastian Frank, Heubeg (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 109 days.

(21) Appl. No.: 15/590,086

(22) Filed: May 9, 2017

(65) Prior Publication Data

US 2017/0328489 A1 Nov. 16, 2017

(30) Foreign Application Priority Data

May 12, 2016 (DE) .................. 10 2016 108 832

(51) Int. Cl.
*F16K 7/12* (2006.01)
*F16K 31/04* (2006.01)
*F16K 37/00* (2006.01)
*F16K 31/122* (2006.01)

(52) U.S. Cl.
CPC .......... *F16K 31/1221* (2013.01); *F16K 7/126* (2013.01); *F16K 31/046* (2013.01); *F16K 37/005* (2013.01); *F16K 37/0041* (2013.01)

(58) Field of Classification Search
CPC .. F16K 31/1221; F16K 31/046; F16K 37/005; F16K 37/0041; F16K 7/126
See application file for complete search history.

(56) References Cited

U.S. PATENT DOCUMENTS

| | | | |
|---|---|---|---|
| 4,542,649 A | | 9/1985 | Charbonneau et al. |
| 4,693,113 A | * | 9/1987 | McNennamy ...... F16K 37/0083 73/1.15 |
| 4,694,390 A | * | 9/1987 | Lee ...................... G05B 19/358 137/487.5 |
| 4,805,451 A | * | 2/1989 | Leon ........................ G01B 7/16 73/168 |
| 4,947,674 A | * | 8/1990 | Strain .................... H01H 19/18 200/47 |

(Continued)

FOREIGN PATENT DOCUMENTS

| DE | 3785256 T2 | 11/1993 |
|---|---|---|
| DE | 19512238 A1 | 10/1996 |

(Continued)

OTHER PUBLICATIONS

German Search Report in connection with the German priority application 10 2016 108 832.3 dated Mar. 29, 2017, with an English translation of the Examiner's opinion.

*Primary Examiner* — Eric Keasel
(74) *Attorney, Agent, or Firm* — Dilworth IP, LLC

(57) ABSTRACT

A method of controlling a valve plunger of a valve makes provision that, prior to the operation, the valve individually runs through a set-up procedure on the basis of a detected closed position, in which set-up procedure the valve plunger exerts an additional force in the direction of the valve seat beyond a detected closed position. The corresponding valve is equipped with an integrated valve controller which performs a corresponding set-up procedure automatically prior to the operation.

19 Claims, 2 Drawing Sheets

(56) References Cited

U.S. PATENT DOCUMENTS

| | | | | |
|---|---|---|---|---|
| 5,029,597 A | * | 7/1991 | Leon | F16K 31/046 |
| | | | | 137/1 |
| 5,329,465 A | | 7/1994 | Arcella et al. | |
| 5,573,032 A | * | 11/1996 | Lenz | G05D 7/005 |
| | | | | 137/486 |
| 5,711,507 A | | 1/1998 | Berget et al. | |
| 2004/0211928 A1 | | 10/2004 | Coura et al. | |

FOREIGN PATENT DOCUMENTS

| | | |
|---|---|---|
| DE | 10248616 A1 | 5/2004 |
| JP | 2009115253 A | 5/2009 |
| WO | 2002093058 A1 | 11/2002 |

* cited by examiner

METHOD OF CONTROLLING A VALVE AND VALVE

FIELD OF THE INVENTION

The invention relates to a method of controlling a valve having a valve plunger and to a valve itself.

BACKGROUND

In the case of a valve, in the closed position the valve plunger is urged against a valve seat directly or with the interposition of an elastomeric sealing apparatus, wherein optionally also the valve seat or only the valve seat can have an elastomer.

It is known from JP 2009 115253 A to close the valve and thereafter to reduce the mechanical loading between the valve plunger and valve seat by virtue of the fact that the valve plunger is rotated back to a minimal extent. A flow measuring device monitors the flow. If the measured flow value exceeds a predetermined limit, the motor is then switched on and more force is applied.

The object of the invention is to provide a novel control method and a novel valve, which serve to reduce the mechanical loading between the valve seat and valve plunger, in particular with the interposition of a valve seal as in the case of a diaphragm valve.

SUMMARY

The invention provides a method of controlling a valve, which has a valve plunger, by virtue of the fact that, prior to the operation, the valve individually runs through a set-up procedure on the basis of a detected closed position, in which set-up procedure a first closed position of the valve plunger is detected, wherein during the subsequent, continuous operation the valve plunger is moved beyond the detected first closed position to a second closed position in which it exerts a force in the direction of the valve seat which comprises an additional force added to the force applied in the first closed position.

The method in accordance with the invention is performed in a reverse manner compared with the aforementioned prior art. In the case of the method in accordance with the invention, each valve is set up discretely, i.e., individually and in the operating situation, in order to optimise it with regard to the closed position to be approached during the operation and the operating conditions in the system, in which the valve is used. During the set-up procedure, the valve plunger is moved as far as to the actually detected (first) position, in which specifically the closed position is reached, i.e., approximately with pinpoint precision, and the closed position is not already significantly "travelled over", as in the prior art. From this specifically achieved closed position, the minimum position of the valve plunger for achieving the closing procedure as it were, a small additional force is also applied in the direction of the valve seat. This ensures that the additional buffer which is reached by this additional force (which is added to the force in the first closed position) is always designed in an identical and minimal manner where possible. Since, in the system in which the valve is installed, a fluid pressure is built up against the closing direction, the method should take place in the set-up phase of the system at the operating pressure during operation of the system.

In the first closed position, the valve plunger is urged with the least possible force against the valve seat such that specifically no flow through the valve can be detected.

The set-up procedure can be performed automatically and in particular by means of the controller integrated in the valve or by means of an externally connected controller, e.g. in that the valve is connected to a central controller via a bus system.

However, the valve can be triggered manually, e.g. directly at the valve, e.g. the valve drive, or by remote-control.

The first closed position during the set-up procedure is detected by sensors because each valve is set-up individually and on the basis of at least one detected value, desired parameters for the second closed position are determined.

According to the preferred embodiment, this detection performed by sensors is effected by virtue of the fact that the flow through the valve is detected by sensors during the set-up procedure. From the point where a predetermined lower limit value of the flow is achieved, in particular when the detected flow "0" is achieved, the first closed position is stored. This can be effected by virtue of the fact that at least one operating parameter of the valve drive in this closed position is detected and stored.

This operating parameter is e.g. the current position of the valve, the current position of the valve plunger, the current pressure in a drive cylinder (hydraulic or pneumatic drive cylinder), the current linear force of the valve exerted via the valve plunger in the direction of the valve seat, the current motor current or the current motor power in an electric actuator for the valve plunger.

During the set-up procedure, at least one predefined value, which in particular is stored in a controller in the valve, is added to the operating parameter detected in the closed position. A so-called supplemented target value which is tailored individually to the valve is hereby determined and stored. This target value is approached during the subsequent operation of the system at the desired closed position. It is to say that this target value makes provision for the additional force in the direction of the valve seat. It should be emphasised that preferably not only one operating parameter but instead a plurality of operating parameters can be stored during the set-up procedure and when the closed position is detected. The supplemented target values can also relate to a plurality of operating parameters. The target value, more specifically the target values, make provision on the whole for a final closing force of the valve, which is within narrower tolerances, in the second closed position during the later continuous operation.

The predefined value which is added to the stored operating parameter can be a path increment for the valve drive, in particular the valve plunger, a pressure increment in a drive cylinder, a force increment, a current increment for the motor current or a power increment for the motor power. These are not ultimately all of the possibilities for path increments and operating parameters which can be used in the method in accordance with the invention.

The predefined value can be input manually and/or changed manually. Alternatively or in addition, the predefined value can be selected manually or automatically from specified values, wherein these values are stored e.g. in the controller of the valve. A further optional or additional possibility is to input or select the predefined value manually or automatically via a bus system connected to the valve.

The flow through the valve can be monitored by sensors during the continuous operation, in particular it can be monitored continuously. If during the later operation, after the set-up procedure, a flow is then detected in the closed position, an automatic readjustment is effected. An increased force is produced in the valve drive in the closed position, wherein a new, readjusted target value is then stored by virtue of the fact that a readjusted operating parameter is used. Such a readjustment can be necessary e.g. if the valve is used at higher operating pressures or if certain settlement procedures should occur in the valve seal.

If higher operating pressures than those during the set-up procedure are detected, a warning signal can be output which demands a new set-up procedure.

In order to increase the accuracy of the set-up procedure, the valve plunger itself can be moved more slowly in the direction of the closed position during the set-up procedure than during the subsequent operation. This prevents the valve plunger from significantly travelling over the optimum first closed position in which the valve switches specifically from the open position to the closed position. Certain signal propagation times or periods of inertia for the moving parts produce small tolerances.

The method in accordance with the invention serves to minimise the forces on the valve plunger and, if present, elastomeric seals. The corresponding closure element is protected by reason of the lower long-term loading. However, in addition closure of the valve is reliably ensured. The service life of the entire closure mechanism, in particular the seal provided, is increased. In addition, energy is also saved if the valve is moved via the drive to the second closed position because a force lower than in the case of previous valves is applied and therefore the energy requirement is lower.

The aforementioned object is also achieved by means of a novel valve, comprising a valve drive and a valve plunger, which is actuated by the valve drive, and an electronic valve controller integrated in the valve. In the valve controller, a set-up procedure is stored which performs the method as claimed in any one of the preceding claims.

The valve in accordance with the invention can have a flow sensor or can be coupled, in terms of control, to a flow sensor via which the first closed position is detected indirectly during the set-up procedure.

In particular, the valve plunger is provided with an elastomeric seal which presses against the valve seat in the first and second closed position. In particular, the valve in accordance with the invention is a diaphragm valve.

Furthermore, the valve in accordance with the invention has at least one sensor integrated therein, for determining at least one of the following operating parameters of the valve: the current position of the valve, the current position of the valve plunger, the current pressure in a drive cylinder, the current linear force of the valve and thus the force of the valve plunger against the valve seat, the current motor current or the current motor power. In general, a conclusion regarding the axial force applied by the valve plunger can be drawn from the motor current or the motor power, in the same way as by virtue of the pressure in the drive cylinder if a hydraulic or pneumatic drive is provided instead of an electric drive.

DETAILED DESCRIPTION

Figure 1:
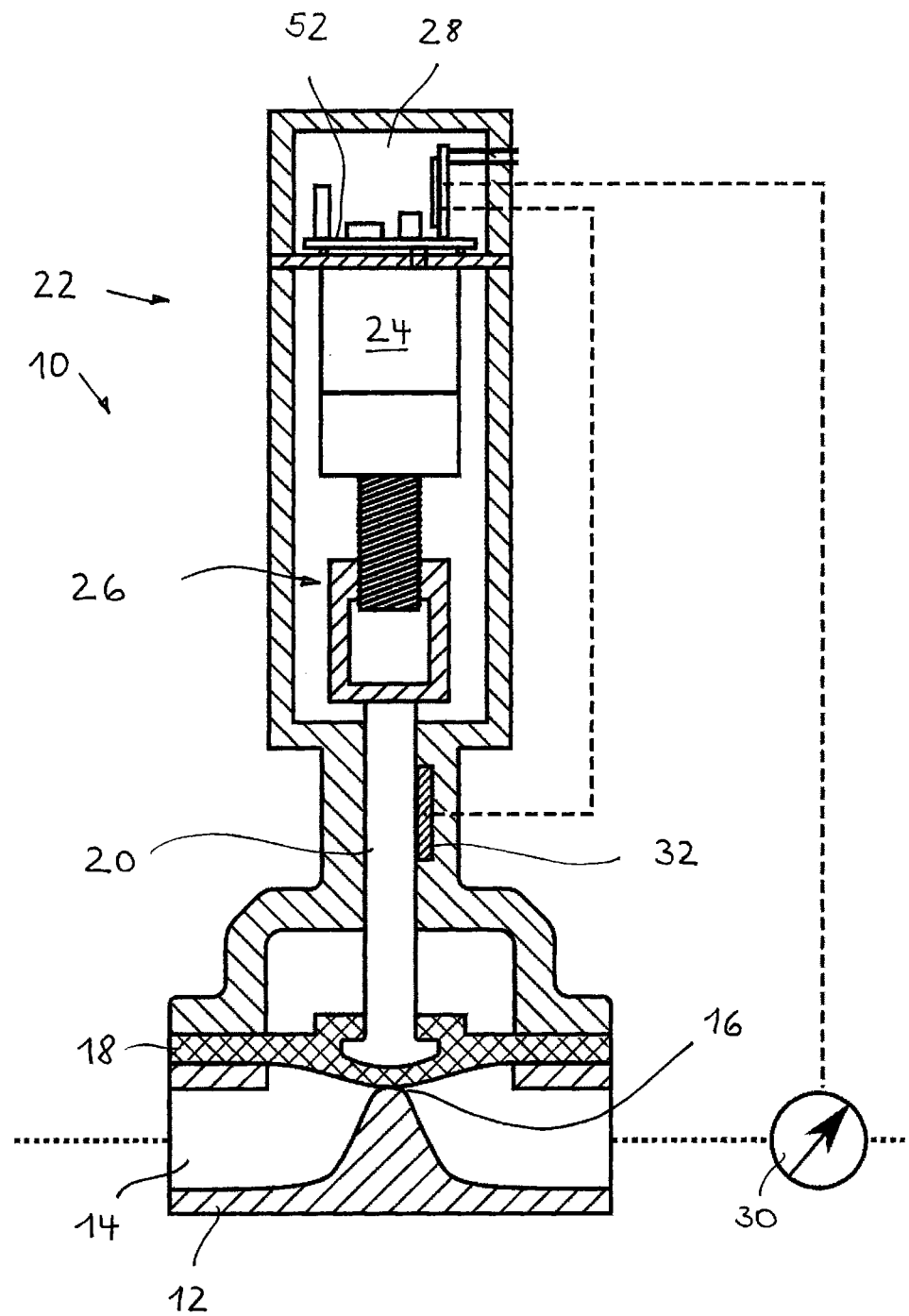
FIG. 1 shows a longitudinal sectional view of a first exemplified embodiment of the valve in accordance with the invention which is operated by the method in accordance with the invention and comprises an electric motor-operated valve drive.

FIG. 1 illustrates a valve 10 comprising a valve body 12, through which a flow channel 14 which transports fluid extends. The flow channel 14 can be opened and closed. For this purpose, a valve seat 16 is provided in the valve body 12. A closure element 18, in this case a diaphragm, can be urged against the valve seat 16 in order to close the valve. For this purpose, the closure element 18 is coupled to a valve plunger 20 which can be moved by means of a valve drive 22 in the direction of the closed position and in the direction of the open position. In the illustrated embodiment, the valve plunger 20 is moved linearly which, however, is not essential to the invention.

In the embodiment illustrated in FIG. 1, the valve drive 22 is an electric motor 24 which is coupled to a gear mechanism 26 to which, in turn, the valve plunger 20 is connected. The illustrated embodiment shows a threaded spindle as the gear mechanism.

Part of the valve 10 is also a valve controller 28 which is integrated therein and can be accommodated in a so-called valve head or cover. Also provided in this region is a display (in particular on the top side of cover) and/or additional actuating elements which allow an operator to actuate the valve. This can also be achieved via a touch-screen.

The controller 28 can also be coupled to an external controller or can be replaced by an external controller, in particular the coupling is effected in this case via a bus system.

A flow sensor 30 can be present either in the valve body 12 or in the connected flow-guiding line, said flow sensor being electrically coupled to the valve controller 28. In addition or alternatively, a path sensor 32 for determining the position of the valve plunger is also provided. Alternatively, this path sensor 32 can also be accommodated in the region of the gear mechanism or in the motor, in order to be able to indirectly determine the position of the valve plunger 20 therefrom.

In addition to the position of the valve plunger 20, other operating parameters of the valve 10 can also be detected via the controller 28 during the operation, specifically the current motor current or the current motor power. From this, it is also possible in the system to ascertain the drive force of the electric motor 24 and/or the pressing force of the valve plunger 20.

In particular, the electric motor 24 is a brushless direct current (BLDC) motor or a stepping motor. Of course, typical asynchronous motors can also be used.

Each valve 10, in the system in which it is installed, is subjected prior to the initial start-up of the system to a set-up procedure which minimizes the energy for maintaining the closed position during the operation and reduces the loading on the closing element 18, thus increasing the service life thereof.

The set-up procedure takes place as follows:

The valve drive 12 is moved in the direction of the closed position preferably more slowly than in the later continuous operation. The set-up procedure can be initiated automatically, i.e., during the first connection or manually via a corresponding input apparatus, such as a touch-screen provided on the valve. Alternatively, this can also be effected externally via an external controller which is connected e.g. via a bus system.

As soon as a flow can no longer be measured in the flow sensor 30, i.e., a measured flow of 0 is achieved, a first closed position is detected by sensors during the set-up operation. Optionally, the electric motor 24 can then be stopped. This closed position is reached with the least possible force at which the flow of zero can be ascertained.

The set-up procedure is performed at a corresponding fluid pressure, to which the valve is also subjected later during the operation.

If during this set-up procedure the detected first closed position is reached, one or a plurality of operating parameters, which are present in this closed position, is/are detected and stored. Said parameters are stored preferably in the controller of the valve itself or in an external controller. In this case, the one or plurality of operating parameters are e.g. the current position of the valve, the current position of the valve plunger 20, detected via the path sensor 32, the current linear force the valve applies, e.g. detected via the currently drawn motor current or the motor power which is currently output when the first closed position is reached.

Values relating to the selected operating parameter(s) are stored in the integrated controller 28 or externally. They can be e.g. specified values stored in a matrix. This/These previously defined value(s) are supplemented with respect to the allocated operating parameter, which is performed automatically in the controller 28 or the external controller. Therefore, a target value, which is individually tailored to the individual valve and the operating situation, is produced by the operating parameter(s) and the predefined, stored value(s) to be added. This/These target value(s) are likewise stored, in particular in the internal controller 28 or the external controller. Therefore, a force increment is determined, a current increment or a power increment in relation to the illustrated embodiment which is to be understood as non-limiting.

As already mentioned, this predefined value, which serves as a buffer and results in an additional force—exerted by the valve plunger 20—in the second closed position, can be stored in the controller, but can also be input manually and/or changed manually. This change can be effected irrespective of where the stored values are stored or whether the valve is connected to a bus system, via which the values are input or entered externally or automatically.

During the subsequent operation, the new target value is approached as the valve is being closed, in that the corresponding operating parameter(s) is/are monitored. This monitoring is effected preferably in a continuous manner.

This ensures that only a relatively small additional force is exerted in the direction of the valve seat 16 by the valve plunger 20.

Since during the operation fluctuations can occur and in addition settlement procedures can inevitably also take place in the elastomers, during the continuous operation the flow through the valve 10 is monitored, in particular continuously monitored, by sensors via the flow sensor 30. Equally, the fluid pressure in the system, which is present at the valve 10, can be continuously monitored. If a flow is detected in the second closed position during the operation, a readjustment is effected automatically. A still further increased force is thus generated in the valve drive 22 in the direction of the closed position and at least one readjusted operating parameter is stored as a readjusted target value and is approached in future for the closed position.

Figure 2:
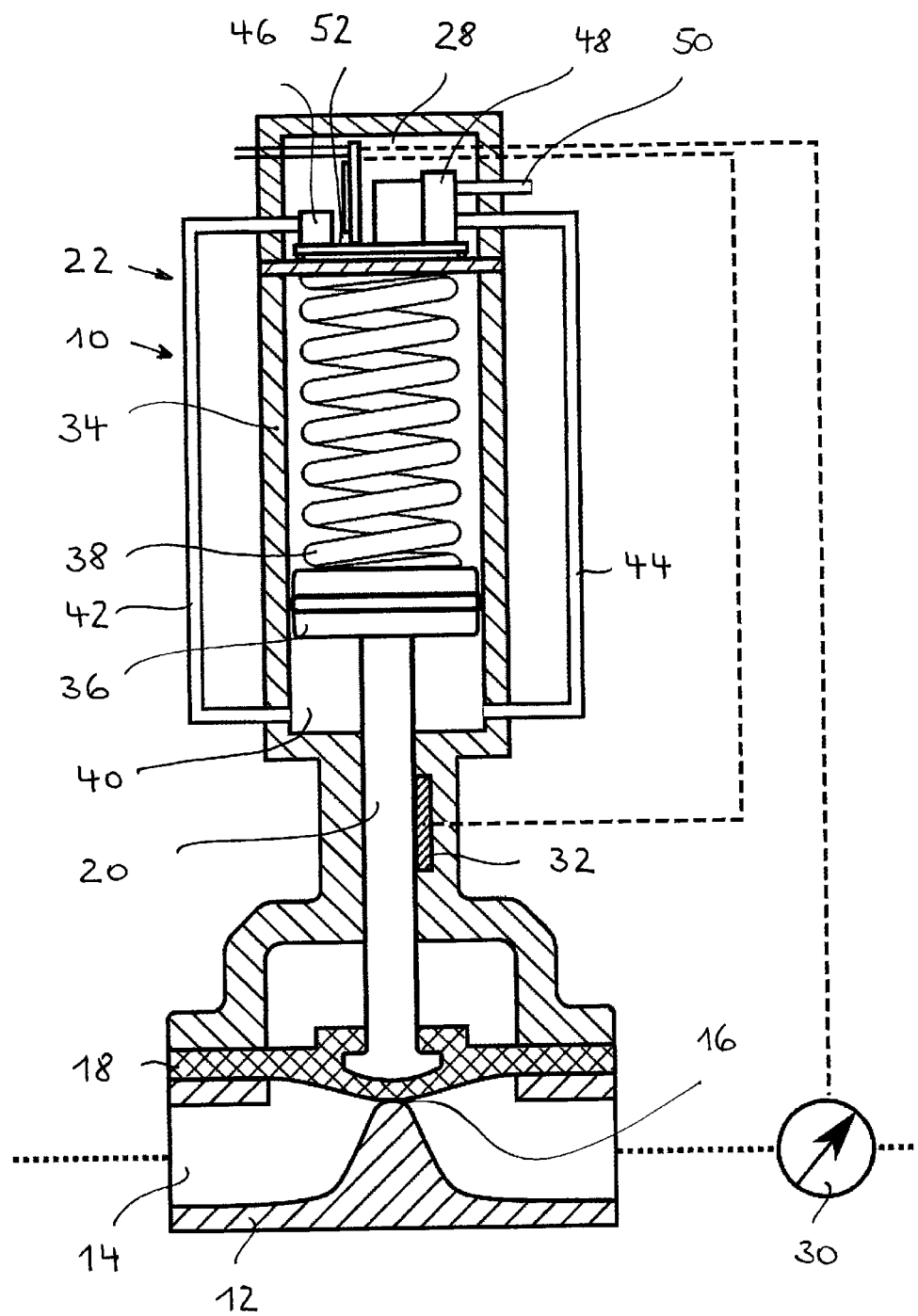
FIG. 2 shows a valve in accordance with the invention which is operated by the method in accordance with the invention and which is driven hydraulically or pneumatically.

The embodiment shown in FIG. 2 corresponds substantially to that shown in FIG. 1 and therefore only the differences will be discussed hereinafter.

Instead of an electric motor 24, the drive 22 which is provided in this case is a drive cylinder 34 in which the valve plunger 20 is coupled to a piston 36. It should be emphasised that, of course, a direct coupling of these two parts is not essential.

In the illustrated exemplified embodiment, which is to be understood as non-limiting, the piston 36 is biased in the direction of the closed position by means of a spring 38 accommodated in a cylinder space. In the event of a failure of the drive 22, the valve 10 thus falls into the closed position.

The cylinder space 40 on the side of the piston 36 opposite the cylinder space comprising the spring 38 is coupled to one or a plurality of fluid lines 42, 44 which, in turn, are connected to the controller 28. A pressure sensor 46 in the controller is coupled to the fluid line 42 and a control valve 48 is coupled to the fluid line 44. A fluid inlet line 50 leads, in turn, to the control valve 48 which allows fluid to flow into the cylinder space 40, wherein the pressure therein can be permanently detected via the pressure sensor 46.

In the closed position during the set-up procedure, fluid is slowly discharged from the cylinder space 40 so that the spring 38 urges the plunger 20 in the direction of the closed position. As soon as the flow sensor 30 detects a flow of 0, one or a plurality of operating parameters, including primarily the pressure in the cylinder space 40, is/are detected. In order to increase the force of the valve plunger for reaching a buffer, a specified pressure in the cylinder space 40 is subtracted from the prevailing pressure during set-up, i.e., the target value of the pressure in the cylinder space 40 is less than the pressure detected in the minimum closed position during set-up. Therefore, the pressure is supplemented by a negative value, specifically the stored value as a "buffer".

Of course, the spring 38 can also be accommodated in the cylinder space 40 and the corresponding opposite space is then hydraulically or pneumatically pressurised.

Furthermore, in the case of the invention the corresponding pressure forces can be ascertained in principle as operating parameters, for which purpose the corresponding piston surface is determined for determining the axial force and is incorporated in the calculation.

In general, it is to be emphasised that the valve can have in particular a storage card 52 in which the corresponding program for performing the set-up procedure is stored and can then be retrieved at the beginning of the operation.

The invention claimed is:

1. Method of controlling a valve, which has a valve plunger, wherein, prior to operation, the valve individually runs through a set-up procedure on the basis of a detected closed position, in which set-up procedure a first closed position of the valve plunger is detected, wherein during subsequent, continuous operation the valve plunger is moved beyond the detected first closed position to a second closed position in which it exerts a force on the valve seat which comprises an additional force added to that applied in the first closed position, wherein the first closed position is detected by sensors and on the basis of at least one detected value, desired parameters for the second closed position are determined, and wherein flow through the valve is detected by sensors during the set-up procedure, and from a point where a predetermined lower limit value of the flow is achieved, the first closed position is stored.

2. The method as claimed in claim 1, wherein the valve automatically performs the set-up procedure after being initiated.

3. The method as claimed in claim 2, wherein the set-up procedure is performed after manually triggering the set-up procedure.

4. The method as claimed in claim 2, wherein the set-up procedure is triggered at a valve drive.

5. The method as claimed in claim 1, wherein the flow through the valve is detected by sensors during the set-up procedure and from the point when a flow of zero is achieved the first closed position is stored.

6. The method as claimed in claim 1, wherein at least one operating parameter of the valve drive is detected and stored in first closed position.

7. The method as claimed in claim 6, wherein the at least one operating parameter comprises current position of the valve, current position of the valve plunger, current pressure in a drive cylinder, current linear force of the valve, current motor current or current motor power.

8. The method as claimed in claim 6, wherein, during the set-up procedure, at least one predefined value is added to the operating parameter to determine and store a supplemented target value tailored individually to the valve, wherein the target value is approached during subsequent operation at the desired closed position.

9. The method as claimed in claim 8, wherein the at least one predefined value is stored in a controller of the valve.

10. The method as claimed in claim 8, wherein the at least one predefined value is a path increment for the valve drive in form of the valve plunger, a pressure increment in a drive cylinder, a force increment, a current increment for the motor current or a power increment for the motor power.

11. The method as claimed in claim 8, wherein the predefined value
is input and/or changed manually.

12. The method as claimed in claim 8, wherein the predefined value is selected manually or automatically from specified values which are stored in the controller of the valve.

13. The method as claimed in claim 8, wherein the predefined value can be input or selected manually or automatically via a bus system connected to the valve.

14. The method as claimed in claim 1, wherein the valve comprises a valve drive and flow through the valve is monitored by sensors during operation, and if, during operation, after the set-up procedure, a flow is detected in the closed position, an automatic readjustment is effected so that an increased force is produced in the valve drive in the closed position, wherein at least one readjusted operating parameter is stored as a readjusted target value.

15. The method as claimed in claim 1, wherein the valve plunger is moved to the first closed position at a slower speed during the set-up procedure than the valve plunger is moved to the second closed position during the subsequent operation.

16. Valve comprising a valve drive and a valve plunger, which is actuated by the valve drive, and an electronic valve controller integrated in the valve, wherein in the valve controller, a set-up procedure is stored which comprises, prior to the operation, individually running the valve through a set-up procedure on the basis of a detected closed position, in which set-up procedure a first closed position of the valve plunger is detected, wherein during subsequent, continuous operation the valve plunger is moved beyond the detected first closed position to a second closed position in which it exerts a force in the direction of the valve seat which comprises an additional force added to that applied in the first closed position, wherein the first closed position is detected by sensors and on a basis of at least one detected value desired parameters for the second closed position are determined, and wherein flow through the valve is detected by sensors during the set-up procedure and from the point where a predetermined lower limit value of flow is achieved the first closed position is stored.

17. The valve as claimed in claim 16, wherein the valve has a flow sensor or is coupled, in terms of control, to a flow sensor.

18. The valve as claimed in claim 16, wherein the valve plunger is provided with an elastomeric seal which presses against the valve seat in the first and second closed position.

19. The valve as claimed in claim 16, wherein the valve has at least one sensor for determining at least one of the following operating parameters of the valve: the current position of the valve, the current position of the valve plunger, the current pressure in a drive cylinder, the current linear force of the valve, the current motor current or the current motor power.

* * * * *